United States Patent
Khaled et al.

(10) Patent No.: US 10,595,274 B2
(45) Date of Patent: Mar. 17, 2020

(54) TIME SYNCHRONIZATION IN RESOURCE CONSTRAINED NETWORKS

(71) Applicant: Itron Global SARL, Liberty Lake, WA (US)

(72) Inventors: Yacine Khaled, Issy les Moulineaux (FR); Imad Jamil, Meudon (FR); Fabrice Monier, Paris (FR)

(73) Assignee: Itron Global SARL, Liberty Lake, WA (US)

( * ) Notice: Subject to any disclaimer, the term of this patent is extended or adjusted under 35 U.S.C. 154(b) by 273 days.

(21) Appl. No.: 15/638,030

(22) Filed: Jun. 29, 2017

(65) Prior Publication Data

US 2019/0007902 A1  Jan. 3, 2019

(51) Int. Cl.
*H04W 4/00* (2018.01)
*H04W 52/02* (2009.01)
*H04W 56/00* (2009.01)
*H04W 24/10* (2009.01)

(52) U.S. Cl.
CPC ....... *H04W 52/0235* (2013.01); *H04W 24/10* (2013.01); *H04W 52/0216* (2013.01); *H04W 52/0229* (2013.01); *H04W 52/0248* (2013.01); *H04W 56/0015* (2013.01)

(58) Field of Classification Search
CPC ............. H04W 52/0235; H04W 24/10; H04W 52/0248
See application file for complete search history.

(56) References Cited

U.S. PATENT DOCUMENTS

| | | | |
|---|---|---|---|
| 9,005,530 B2 | 4/2015 | Nevin | |
| 9,055,530 B2 | 6/2015 | HomChaudhuri et al. | |
| 2005/0094617 A1 | 5/2005 | Lee | |
| 2013/0044658 A1* | 2/2013 | Zhu | H04W 52/0229 370/311 |
| 2013/0272180 A1* | 10/2013 | Hiremath | H04W 52/028 370/311 |
| 2014/0146727 A1* | 5/2014 | Segev | H04W 48/08 370/311 |
| 2016/0212718 A1* | 7/2016 | Park | H04W 56/00 |

OTHER PUBLICATIONS

PCT Search Report and Written Opinion dated Sep. 4, 2018, for PCT Application No. PCT/US18/38202, 16 pages.

* cited by examiner

*Primary Examiner* — Abdelnabi O Musa
(74) *Attorney, Agent, or Firm* — Lee & Hayes, P.C.

(57) ABSTRACT

Techniques for providing additional timing information in periodic beacons in a network to enable battery powered devices to determine more appropriate listening windows for receiving the periodic beacons are described herein. In some examples, the battery powered devices use the additional information to determine more accurate listening windows based on a drift time of their internal clocks, and a jitter time of the network and/or a Coordinated Universal Time (UTC). Additionally, techniques for modifying when mains powered devices update their internal clocks based on transmission of beacons to downstream devices are described herein. For instance, the mains powered devices may refrain from updating their internal clocks to an updated network reference time until transmission of downstream beacons have occurred. In this way, timing synchronization of devices in a network may be improved, and battery life of battery powered devices in the network may be extended.

19 Claims, 7 Drawing Sheets

TIME SYNCHRONIZATION IN RESOURCE CONSTRAINED NETWORKS

BACKGROUND

Communication networks, such as wireless mesh networks, star networks, and so on, are used to connect a variety of different devices. These communication networks often contain devices having different characteristics and capabilities. For instance, these networks may include "smart" utility meters such as electric, water and gas meters that are connected devices capable of reporting resource consumption readings over a communication network. While some meters, such as electric meters, are powered by alternating current electricity service ("mains power") from the electricity grid, other devices, such as many water and gas meters, are battery powered. In many cases, such battery powered devices are expected to operate for extended periods of time (twenty years or more) without being recharged.

Devices in communication networks synchronize their internal clocks with each other to ensure timing accuracy for communications between the devices. However, various factors cause the timing of the clocks to drift apart from each other, such as inaccuracies in the internal clocks, jitter in the network, etc. To account for changes in the timing of the internal clocks for the devices, periodic beacons may be sent from a root node to downstream devices which indicate times by which the devices synchronize their clocks. Mains powered devices in the network will receive these beacons as they are constantly listening for these periodic transmissions. However, battery powered devices may operate with power consumption restraints which prevent them from constantly listening for the periodic beacons. For example, battery powered devices may operate in a low-power operating mode where they are unable to receive transmissions, and "wake-up" into an active operating mode according to a communication schedule for a period of time (e.g., "listening window") to receive the periodic transmissions. However, due to the changes in the timing of the internal clocks for the devices, the listening window may shift by a timing error that causes the battery powered device to miss the periodic beacons, causing the battery powered device to become unsynchronized with the other devices in the network. While the listening windows may be extended for longer periods of time, or be performed more frequently, this causes the battery powered device to consume more battery power and result in unacceptable reductions in battery life.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
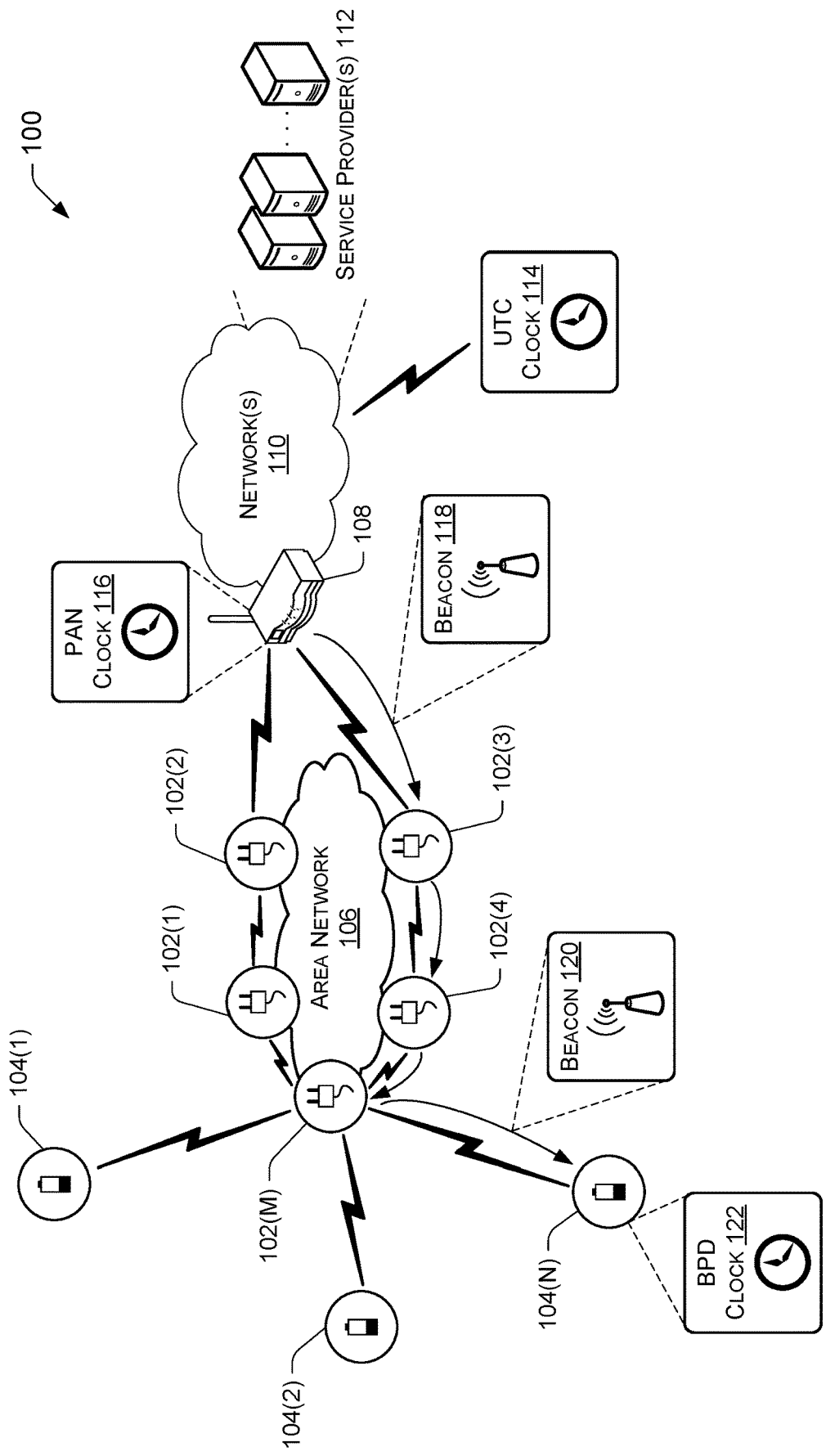
FIG. 1 is a schematic diagram of an example network architecture.

As discussed above, devices in communication networks may synchronize their internal clocks with each other to ensure timing accuracy for communications between the devices. In some examples, each of the devices may store a common communication schedule, or reporting schedule, which indicates times at which the devices are to send and receive communications between each other. The communication schedule may have time slots during which the devices are to begin, and end, sending and receiving certain types of information. However, if the internal clocks of the devices are not accurately synchronized, data communicated between devices based on the communication schedule may be lost. To maintain synchronization between the internal clocks of the devices, a root node or Personal Area Network (PAN) coordinating device may update its clock based on a reference clock time, such as a Coordinated Universal Time (UTC), and propagate the clock time that was synchronized to the UTC down the network to the devices to synchronize the internal clocks for all of the devices. In some examples, the PAN coordinating device may periodically update its internal clock using the UTC and propagate the updated UTC time throughout the network, such as by sending a beacon message, according to the communication schedule stored at each of the network devices. In this way, each of the devices will be aware of when they are going to receive the periodic beacon message including synchronized timing information, and transmit the synchronized timing information to downstream devices.

As noted above, mains powered devices in the network, which generally operate free of power constraints, may continuously be in an active listening state to receive the periodic beacon messages including the synchronized timing information. However, battery powered devices may operate with power consumption restraints which prevent them from constantly listening for the periodic beacon messages. For example, battery powered devices may operate in a low-power operating mode (e.g., sleeping mode) where they are unable to receive transmissions, and "wake-up" into an active operating mode according to the communication schedule for a period of time (e.g., "listening window") to receive the periodic beacon transmissions. However, due to the changes in the timing of the internal clocks for the devices and/or jitter in the network (e.g., processing delays, buffering delays, UTC jitter and offsets, etc.), the listening window may shift by a timing error that causes battery powered devices to miss the periodic beacons, causing the battery powered devices to become unsynchronized with the other devices in the network. While the listening windows may be extended for longer periods of time, or be performed more frequently, this causes the battery powered device to consume more battery power and result in unacceptable reductions in battery life.

This disclosure describes techniques directed to providing additional timing information in periodic beacon messages to enable battery powered devices to determine more accurate and/or appropriate listening windows for receiving the periodic beacons. Additionally, the techniques described herein include modifying the timing for when mains powered devices update their internal clocks based on retransmission of the periodic beacons to downstream devices. In some examples, the mains powered devices may wait to update their internal clocks until the updated network reference time has been sent in a beacon to all associated downstream devices to ensure that the downstream devices are "awake" to receive the periodic beacons. In this way, downstream devices may not miss the periodic beacons due to the internal clocks of the mains powered devices having already changed.

Traditionally, periodic beacon messages have included synchronized timing information that includes an updated network reference time propagated throughout the network, which may originate from with the PAN coordinating device of the network that set a current UTC as the updated network reference time. However, when battery powered devices receive the synchronized timing information, they are unable to determine whether the changes between their current internal clock time and the updated network reference time are caused by their own internal clock inaccuracies, jitter in the network, jitter in the UTC, or other sources that cause timing inaccuracies in a network. In some examples, jitter in the UTC may be cause by the mechanism used to get the UTC resulting in the accuracy of the UTC not being guaranteed, which results in offsets and jumps (e.g., jitter). In light of this, battery powered devices have extended their listening windows for the periodic beacon messages for longer periods of time, or have increased the frequency of waking from their low-power operating mode to the active operating mode to create more frequent listening windows. However, extending listening windows, or the frequency of listening windows, may result in reductions in battery life that may be unacceptable for battery powered devices which are expected to operate for extended periods of time without being recharged.

In some examples, the techniques described herein include are directed to nodes in a network, such as mains powered devices and battery powered devices, which are configured with various modules for calculating differences between an updated network reference time (e.g., UTC) and a current network reference time on internal clocks for each of the devices. For example, a mains powered device may receive a beacon message that has synchronized timing information including an updated network reference time, and determine a computed time difference between the current network reference time of the mains powered device's internal clock. The mains powered device may then transmit a beacon message to downstream nodes, such as battery powered devices positioned as leaf nodes in a network, where the beacon message includes the updated network reference time as well as the computed time difference.

Traditionally, mains powered devices have synchronized their internal clocks with the updated network reference time upon receipt of the beacon message from an upstream node. However, in some examples there may be a relatively large difference between the current network reference time of the mains powered device's internal clock and the updated network reference time. While the mains powered device still transmits a beacon message to its downstream nodes based on the shared communication schedule, this difference in time may cause the mains powered device to transmit the beacon message at a time which is outside the listening window of the children battery powered devices. Accordingly, the techniques described herein include configuring a mains powered device to refrain from synchronizing or updating its internal clock with the updated network reference time until transmission of the beacon message to the downstream nodes has occurred. Once transmission of all beacon messages to any and all groups of battery powered devices downstream from the mains powered device has occurred, the mains powered device may then synchronize its internal clock with the updated network reference time.

As noted above, in some examples the mains powered devices in the network may calculate differences between the updated network reference time (e.g., UTC) and the current network reference time of internal clocks for each of the mains powered devices. For example, a mains powered device may receive a beacon message that has synchronized timing information including an updated network reference time, and determine a computed time difference between the current network reference time of the mains powered device's internal clock. The mains powered device may then transmit the beacon message to downstream battery powered devices where the beacon message includes the updated network reference time as well as the computed time difference. The battery powered device may include modules and/or algorithms which use the updated network reference time in combination with the computed time difference to determine a new listening window duration for a subsequently scheduled periodic beacon message transmission. In prior methods, the battery powered devices would be unable to ascertain whether the difference between the updated network reference time received in a beacon message and the current network reference time of their internal clocks is due to inaccuracies of the battery powered devices' internal clock, or other inaccuracies in the network and/or jitter in the UTC. Thus, battery powered devices would have to set their listening windows very conservatively to ensure that the periodic beacon messages were received, and not dropped, to maintain synchronization with the devices in the network. However, the techniques described herein allow the battery powered devices to make a more intelligent decisions regarding the length of subsequent listening windows.

In some examples, a battery powered device may determine an inaccuracy of its internal clock, or a "drift time" estimation. For instance, the battery powered device may compare its current network reference time of its internal clock with the updated network reference time to determine a difference in time between them. The battery powered may then compare that difference in time with the computed time difference received in the beacon message from the mains powered device to identify how much of the difference in time between the current network reference time and the updated network reference time was caused by inaccuracies in the internal clock of the battery powered device (e.g., drift time). Similarly, the mains powered devices may also determine inaccuracies of their internal clocks using similar techniques to those used by the battery powered devices.

In some examples, the battery powered device may then determine a length of time for a subsequent listening window based at least in part on the drift time and jitter time (e.g., UTC jitter, processing delays for network devices, buffering delays for network devices, etc.). For instance, the battery powered device may add the drift time, the jitter time, and an average time for receiving/decoding a preamble of a beacon message ("preamble time") to determine the listening window. In other examples, the battery powered device may multiple the drift time and jitter time by various factors (e.g., factor of 1.5, 2.0, 3.0, etc.) and add the preamble time to determine a more conservative listening window for subsequent beacon messages. In this way, the battery powered device may more intelligently calculate listening windows for receiving beacon messages, which may prevent the use of overly-conservative listening windows, and in turn extend battery life of the battery powered device. The jitter may represent or be associated with the uncertainty of the node's ability to identify the exact location of the battery powered device's starting point for receiving the preamble of the beacon. Stated otherwise, the battery powered device is unable to precisely determine the start time of the preamble of the beacon due to the jitter time. The uncertainty is due to, at least in part, with the resolution of the battery powered device's clock for timing network events and any associated latencies.

Accordingly, the techniques described herein may improve the synchronization of timing between devices in networks, and improve battery life performance for battery powered devices in networks.

While the examples described herein are with reference to receiving beacon messages, the techniques may be similarly applied for any type of communication performed by devices on a network (e.g., transmissions of resource consumption data, transmission of device updates, etc.). In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communications network, control network, and/or another type of network or system. In one example, the techniques may be implemented in the context of the Internet of Things (IoT).

By way of example and not limitation, network communication devices (sometimes referred to as nodes, computing devices, or just devices) include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, access points, portable navigation devices, portable gaming devices, portable media players, televisions, set-top boxes, computer systems in an automobile (e.g., navigation systems), cameras, robots, hologram systems, security systems, home-based computer systems (e.g., intercom systems, home media systems, etc.), projectors, automated teller machines (ATMs), and so on. In some instances, a network communication device may comprise a battery powered network communication device (also referred to as a "battery powered device") that relies on a battery for power (i.e., is not connected to mains power). In other instances, a network communication device (also referred to as a "mains powered device") may comprise a mains powered device that relies on mains power for electricity.

Example Environment

FIG. 1 is a diagram illustrating an example networked environment or architecture 100. The architecture 100 includes multiple network communication devices. The network communication devices include mains powered devices (MPD) 102(1), 102(2), 102(3), 102(4), . . . 102(M) (collectively referred to as "MPDs 102"), and battery powered devices (BPDs) 104(1), 104(2), . . . 104(N) (collectively referred to as "BPDs 104"), where M and N are any integers greater than or equal to 1 and may be the same number or different numbers. In some illustrations, the MPDs 102 include more functionality/resources than the BPDs 104. In one example, the MPDs 102 are connected to mains electricity (e.g., electricity meters), while the BPDs 104 are not connected to mains electricity (e.g., water meters, gas meters, etc. that employ batteries). In other examples, the MPDs 102 and BPDs 104 may have different processing power, processing capabilities, and so on. The techniques discussed herein may be implemented to communicate between MPDs 102, BPDs 104, or any combination of devices.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), Field Area Networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the area network 106 may comprise a star network, in which a central device acts a parent to one or more children devices. For example, the MPD 102(M) may act as a parent to the BPDs 104(1), 104(2), and 104(N). Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the BPDs 104 are implemented as leaf nodes. A leaf node may generally communicate with a parent node and not relay data for another node. As illustrated in FIG. 1, the BPDs 104(1) and 104(2) act as leaf nodes, with the MPD 102(M) being the parent node. However, in other examples the BPDs 104 may relay data for other nodes. Further, any type of device may be implemented as a leaf node (e.g., any of the MPDS 102).

The network communication devices also include an edge device, such as a Personal Area Network (PAN) coordinator device 108, which serves as a connection point of the AN 106 to one or more networks 110 (e.g., a backhaul network), such as the Internet. The PAN coordinator device 108 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this illustrated example, the PAN coordinator device 108 may relay communions from the AN 106 to one or more service providers 112 via the network(s) 110. The PAN coordinator device 108 may comprise any type of edge device depending on the network and network topology.

In some instances, the one or more service providers 112 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the one or more service providers 112 comprise other systems to implement other functionality, such as web services, cloud services, and so on. In yet other instances, the one or more service providers 112 may be implemented as other types of devices, such as in the context of the Internet of Things (IoT) that allows a variety of devices to exchange data.

The one or more service providers 112 may be physically located in a single central location, or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, a BPD 104 may connect to a network by connecting directly with a MPD 102. To illustrate, a battery powered water meter, for example, the BPD 104(1), discovers in its vicinity an electricity meter, the MPD 102(M), connected to mains power. Because the MPD 102(M) is connected to mains power, it has no practical energy constraints. The BPD 104(1) may associate the MPD 102(M) as its parent, in which case the MPD 102(M) acts as the connecting point between the BPD 104(1) and the one or more service providers 112.

In some examples, the PAN coordinator device 108 may communicate over the network(s) 110 to obtain a UTC from a UTC clock 114. For instance, the PAN coordinator device 108 may call a web-based API to determine the UTC from a UTC clock 114, access the Internet via a wireless cellular network, or DSL wired network, or perform some other operation for determining the UTC. In some examples, the PAN coordinator device 108 may include a PAN clock 116. The PAN clock 116 may be periodically updated based on a communication schedule. In some examples, the PAN coordinator device 108 may periodically determine the UTC from the UTC clock 114 and update its PAN clock 116 based on the UTC.

In some examples, the PAN coordinator device 108 may propagate the clock 116 time of the PAN coordinator device that was synchronized to the UTC time down the AN 106 to the devices according to a periodically scheduled beacon message 118. The UTC time, or updated network reference time, may be sent along the AN 106 to each of the devices, such as the MPDs 102 down to the BPDs 104. The beacon message 118 may include various types of synchronized timing information, such as the updated network reference time. In some examples, one or more nodes of the AN 106 may determine or calculate a difference between the updated network reference time and a current network reference time on an internal clock of the nodes. For instance, MPD 102(M) may calculate a time difference between the updated network reference time that has been propagated through AN 106, and the current network reference time of its internal clock. The MPD 102(M) may then send a beacon message 120 including synchronized timing information, such as the updated network reference time and the calculated time difference, to downstream nodes, such as BPD 104(N). In some examples, the MPD 102(4) may be configured to refrain from synchronizing or updating its internal clock until transmission of the beacon message 120 has occurred or is completed.

In various examples, the BPD 104(N) may include one or more modules for causing the BPD 104(N) to transition from a low-power operating mode, or "sleep mode," to an active operating mode for a period of time, or a listening window. In some instances, modules of the BPD 104(N) may determine an updated listening window for one or more subsequently scheduled periodic beacon message transmissions. For instance, the modules may determine, based at least in part on the updated network reference time and the calculated time difference, a listening window that is different than a currently implemented listening window. In some examples, calculating an updated listening window may improve time synchronization and/or battery life performance for the BPDs 104.

Example Network Communications Devices

Figure 2:
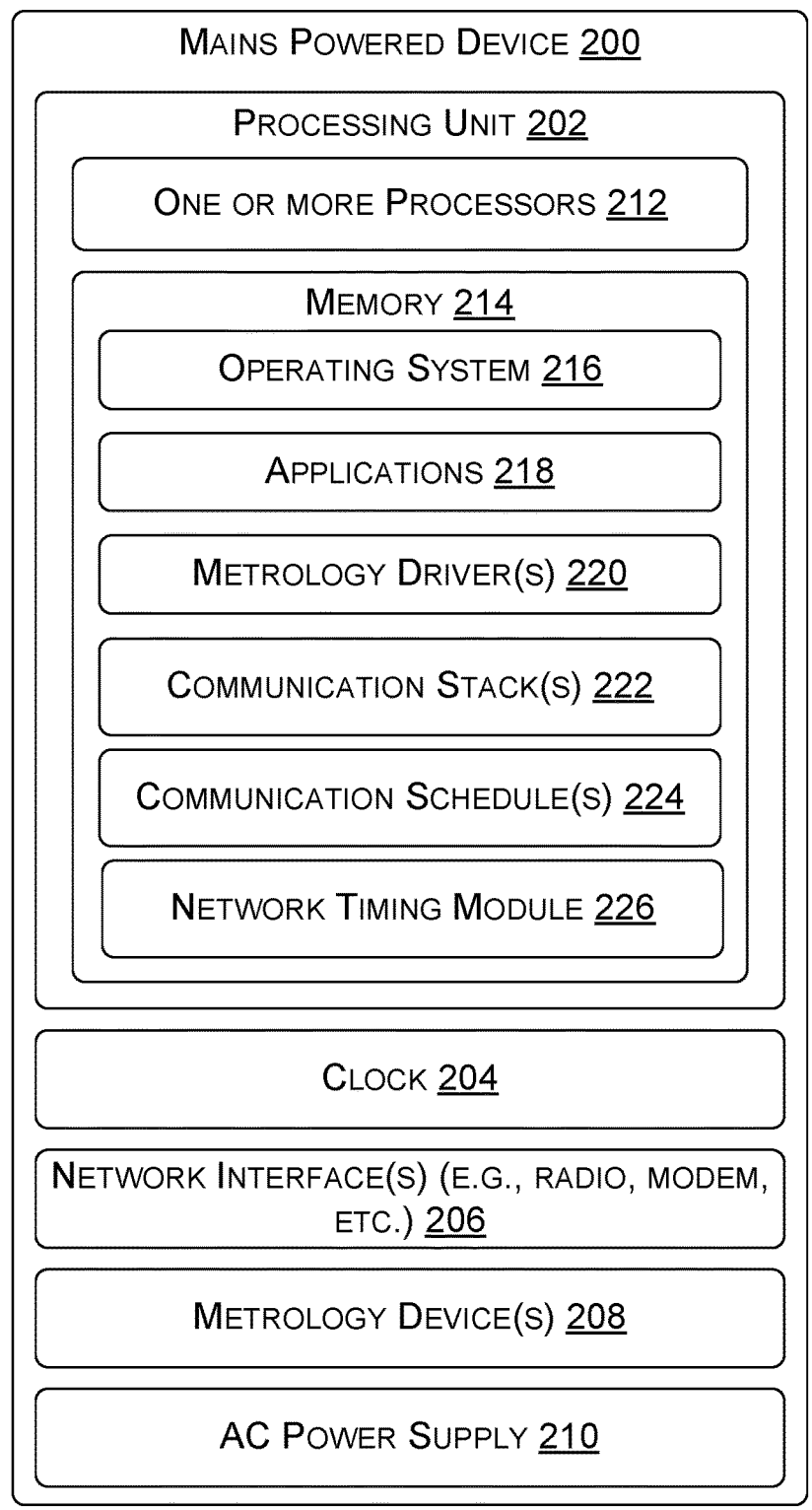
FIG. 2 is a diagram showing details of an example Mains Powered Device.

FIG. 2 is a diagram showing details of an example Mains Powered Device 200 (MPD). In this example, MPD 200 comprises a device that is connected to mains power, such as an electricity meter, sensor, etc. As discussed above, MPDs can take numerous different forms, depending on the industry and context in which they are deployed. Different types of MPDs may have different physical and/or logical components. For instance, utility meter MPDs such as that shown in FIG. 2 may have metrology components, whereas other types of MPDs may not.

As shown in FIG. 2, the example MPD 200 includes a processing unit 202, a clock 204, one or more network interfaces 206 (e.g., transceiver, power line communication module, etc.), one or more metrology devices 208, and an alternating current (AC) power supply 210 that couples to the AC mains power line wherein the MPD 200 is installed. The processing unit 202 may include one or more processors 212 and memory 214. When present, the one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The clock 204 may comprise a real-time clock (RTC), such as an integrated circuit or other hardware-based clock, which keeps track of the current time for the MPD 200. In some examples, the clock 204 may be configured to be updated or synchronized by modules of the MPD 200. In some examples, the clock 204 may have various hardware-based inaccuracies which cause a time drift, and require that the clock 204 be updated or re-synchronized.

The network interface(s) 206 may include a transceiver comprised of one or more hardware and/or software implemented radios to provide two-way RF communication with other network communication devices in the AN 106 and/or other computing devices via the network 110. The transceiver may additionally or alternatively include a modem to provide power line communication (PLC) communication with other network communication devices that are connected to an electrical service grid.

The metrology device(s) 208 comprise the physical hardware and sensors to measure consumption data of a resource (e.g., electricity, water, or gas) at a site of the meter. In the case of an electric meter, for example, the metrology device(s) 208 may include one or more Hall effect sensors, shunts, or the like. In the case of water and gas meters, the metrology device(s) 208 may comprise various flow meters, pressure sensors, or the like. The metrology device(s) 208 may report the consumption data to the one or more service providers 112 via the network interfaces 206. The consumption data may be formatted and/or packetized in a manner or protocol for transmission.

The memory 214 includes an operating system (OS) 216 and one or more applications 218 that are executable by the one or more processors 212. The memory 214 may also include one or more metrology drivers 220 configured to receive, interpret, and/or otherwise process the metrology data collected by the metrology device(s) 208. Additionally, or alternatively, one or more of the applications 218 may be configured to receive and/or act on data collected by the metrology device(s) 208.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, an IPv6 Routing Protocol for Low-Power and Lossy Networks (RPL), and/or another protocol. However, in other examples, other protocols may be used, depending on the networks with which the device is intended to be compatible. The communication stack(s) 222 describe the functionality and rules governing how the MPD 200 interacts with each of the specified types of networks. For instance, the communication stack(s) 222 may cause MPDs and BPDs to operate in ways that minimize the battery consumption of BPDs when they are connected to these types of networks.

In some instances, the MPD 200 may be configured to send or receive communications on multiple channels simultaneously. For example, the network interfaces 204 may be configured to receive data at the same time on hundreds of channels. Additionally, or alternatively, the network interface(s) 206 may be configured to send data at the same time on hundreds of channels. In some examples, the communication stack(s) 222 may cause the MPD 200 to communicate via various network layers, such as an application layer, a media access control (MAC) layer, or any other layers in a network.

In various examples, the communication stack(s) 222 may be configured to communicate according to one or more communication schedules 224. The communication schedules 224 may be stored at each of the devices in a network, and identify time slots during which the MPD 200 is to communicate. For instance, a communication schedule 224 may identify periodic windows of time during which the MPD 200 is to receive beacon messages with synchronized timing information from upstream nodes, and transmit the synchronized timing information to downstream nodes. The periodicity for the beacon message communication indicated by the communication schedules 224 may comprise any frequency (e.g., 5 minutes, 30 minutes, 1 hour, etc.).

In some examples, the memory 214 further includes a network timing module 226. The network timing module 226 may be configured to, or comprise algorithms to, calculate differences between an updated network reference time (e.g., UTC) received in a beacon message from an upstream node, and the current network reference time indicated by the clock 204. For example, the MPD 200 may receive a beacon message that has synchronized timing information including an updated network reference time, and determine a computed time difference between the current network reference time of the clock 204. The communication stacks 222 may then transmit a beacon message to downstream battery powered devices where the beacon message includes the updated network reference time as well as the computed time difference. In some examples, the network timing module 226 and the communication stacks 222 may work in conjunction to transmit the beacon message to downstream devices, and to update the clock 204 based on the updated network reference time. For instance, the network timing module 226 may calculate the time difference, and the communication stacks 222 may send the beacon message including the updated network reference time as well as the computed time difference to downstream nodes. The communication stacks 222 may then provide an indication to the network timing module 226 that transmission of the beacon message or messages has occurred or finished, and upon receiving this indication, the network timing module 226 may determine to update the clock 204 based on the updated network reference time. In this way, the communication stacks 222 of the MPD 200 may transmit the beacon message at a time the downstream devices are expecting the message, rather than at the updated network reference time which may result in dropped packets or messages by the downstream nodes (e.g., BPDs 104).

Figure 3:
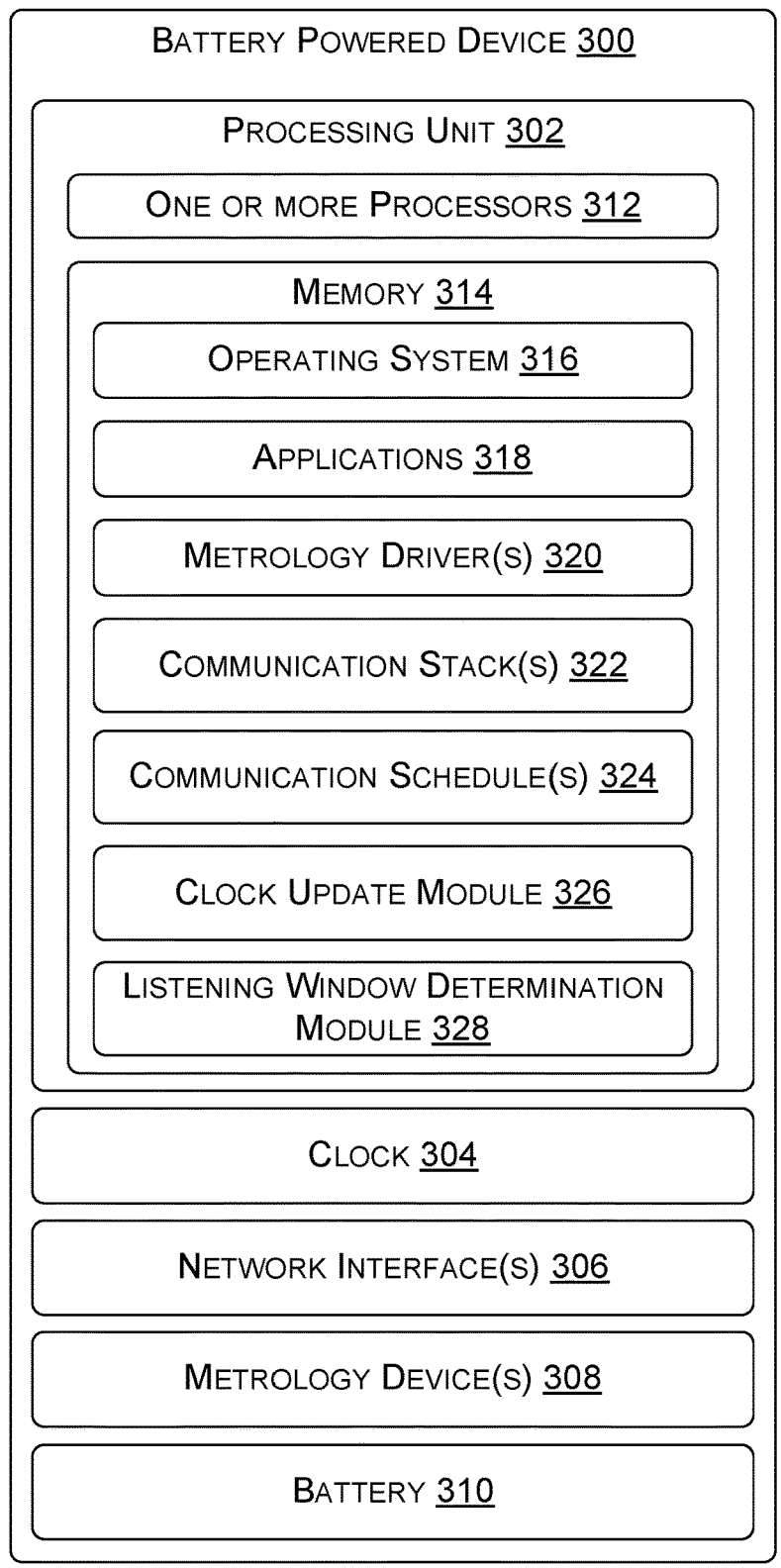
FIG. 3 is a diagram showing details of an example Battery Powered Device.

FIG. 3 is a diagram showing details of an example Battery Powered Device 300 (BPD). In this example, BPD 300 comprises a device that is not connected to mains power. However, as discussed above, BPDs can take numerous different forms, depending on the industry and context in which they are deployed. Different types of BPDs may have different physical and/or logical components. For instance, utility meter BPDs such as that shown in FIG. 3 may have metrology components, whereas other types of BPDs may not.

The BPD 300 of FIG. 3 is similar in many respects to the MPD 200. To the extent that the MPD 200 and BPD 300 include the same or similar components, the functions will not be repeated here. Therefore, the following discussion of the BPD 300 focuses on the differences between the BPD 300 and the MPD 200. However, the differences highlighted below should not be considered to be exhaustive. One difference between the MPD 200 and the BPD 300 is that the BPD 300 may include a battery 310 instead of the AC power supply 210. The specific characteristics of the battery 310 may vary widely depending on the type of BPD 300. By way of example and not limitation, the battery 310 may comprise a Lithium Thionyl Chloride battery (e.g., a 3-volt battery having an internal impedance rated at 130 Ohms), a Lithium Manganese battery (e.g., a 3-volt battery having an internal impedance rated at 15 Ohms), a Lithium Ion battery, a lead-acid battery, an alkaline battery, and so on.

Also, in some examples, even components with similar functions may be different for MPDs than for BPDs due to the different constraints. As one example, while both MPDs and BPDs have network interfaces 306 including transceivers, the specific transceivers used may be different. For instance, an MPD transceiver may include a PLC modem while a BPD transceiver does not because the BPD is not connected to an electrical power line that could be used for PLC communications. Additionally, or alternatively, a BPD transceiver may employ a lower power RF radio to minimize energy consumption. Further, other components of MPDs and BPDs may vary. In some instances, BPDs are implemented with less functionality and/or include less hardware components than the MPDs. Further, in some instances components of BPDs are lower power components than the corresponding components of the MPDs.

The memory 214 of the MPD 200 and memory 314 of the BPD 300 is shown to include software functionality configured as one or more "modules." However, the modules are intended to represent example divisions of the software for purposes of discussion, and are not intended to represent any type of requirement or required method, manner, or necessary organization. Accordingly, while various "modules" are discussed, their functionality and/or similar functionality could be arranged differently (e.g., combined into a fewer number of modules, broken into a larger number of modules, etc.).

In some examples, the memory 314 may include communication stacks 322, communication schedules 324, a clock update module 326, and a listening window determination module 328. As described above with respect to the communication stacks 222 of the MPD 200, the communication stacks 322 may communicate (e.g., transmit, receive, etc.) on behalf of the BPD 300. In some instances, the communication stacks 322 may cause the BPD 300 to transition between a low-power operating mode (e.g., collecting metrology data via metrology devices 308) and an active operating mode (e.g., receiving data, transmitting data, etc.), where the low-power operating mode turns off various components of the BPD 300 and consumes less battery power from the battery 300 than the active operating mode. The communication stacks 322 may analyze the communication schedule 324 to determine periods of time during which the BPD 300 is not communicating with other devices, and transition the BPD 300 to the low-power operating mode. For instance, the communication stacks 322 may determine, based on the communication schedule 324, that the BPD 300 periodically receives beacon messages (e.g., every 30 seconds, every 5 minutes, every 30 minutes, etc.) for specified window of time, and transition the BPD 300 into the low-power operating mode between the windows of time for each periodic beacon transmission. In this way, the BPD 300 conserves the life of the battery 310.

In various examples, the BPD 300 includes a clock update module 326 which updates the time of the clock 304. For instance, the communication stacks 322 may receive, via the network interfaces 306, a beacon message from an upstream node (e.g., MPD 200) that has synchronized timing information including an updated network reference time, and a computed time difference between a current network reference time of the MPDs 200 clock 204 and the updated network reference time propagated from the PAN coordinator device 108. The clock update module 326 may update the clock 304 according to the time indicated by the updated network reference time, thus synchronizing the clock 304 of the BPD 300 with the rest of the devices in the AN 106.

In various examples, the listening window determination module 328 may determine a length of time for a subsequent listening window using the updated network reference time and the computed time difference received from the MPD 200 in the beacon message. For example, the listening window determination module 328 may determine an inaccuracy of the clock 304, or a "drift time" estimation. For instance, listening window determination module 328 may compare its current network reference time of the clock 304 with the updated network reference time to determine a difference in time between the two. The listening window determination module 328 may then compare that difference in time with the computed time difference received in the beacon message from the MPD 200 to identify how much of the difference in time between the current network reference time and the updated network reference time was caused by inaccuracies in the clock 304 of the BPD 300 (e.g., drift time). In some examples, the jitter may be caused by processing delays in the devices of the AN 106, UTC jitter and offsets, etc.

In some examples, the listening window determination module 328 may then determine the length of time for the subsequent listening window based on the determined drift time and jitter time. For instance, the listening window determination module 328 may simply add the drift time, the jitter time, and an average time for receiving/decoding a preamble of a beacon message ("preamble time") to determine the listening window. In other examples, the listening window determination module 328 may multiple the drift time and jitter time by various factors (e.g., factor of 1.5, 2.0, 3.0, etc.) and add the preamble time to determine a more conservative listening window for subsequent beacon messages. In this way, the listening window determination module 328 may more intelligently calculate listening windows for receiving beacon messages, which may prevent the use of overly-conservative listening windows, and in turn extend battery life of the battery powered device. The communication stacks 322 may then cause the BPD 300 to transition between the low-power operating mode and the active operating mode based on the listening window determined by the listening window determination module 328 for each scheduled periodic beacon communication. In some examples, the listening window determination module 328 may determine a listening window each time a periodic beacon message is received, every other time, or at any sampling rate.

The various memories (e.g., memory 214, memory 314, etc.) described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the MPD 200 and the BPD 300) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

By way of example and not limitation, the MPD 200 and/or the BPD 300 may implement a variety of modulation techniques and/or data rates, such as frequency-shift keying (FSK) 802.15.4 g (e.g., mandatory mode with a data rate of 50 kbps or 75 kbps, no forward error correction; legacy mode with a data rate of 150 kbps with forward error correction code rate 1/2; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

In many instances, information that is included in an information element may be stored in the memory 214 of the MPD 200 and/or the BPD 300. For example, the memory 214 may store any information regarding an operating context, such as schedule data, channel data, seed data, timing data, and so on. In some instances, components of the MPD 200 and/or the BPD 300 may reference the information to determine how to communicate according to a specific operating context.

Example Processes

Figure 4:
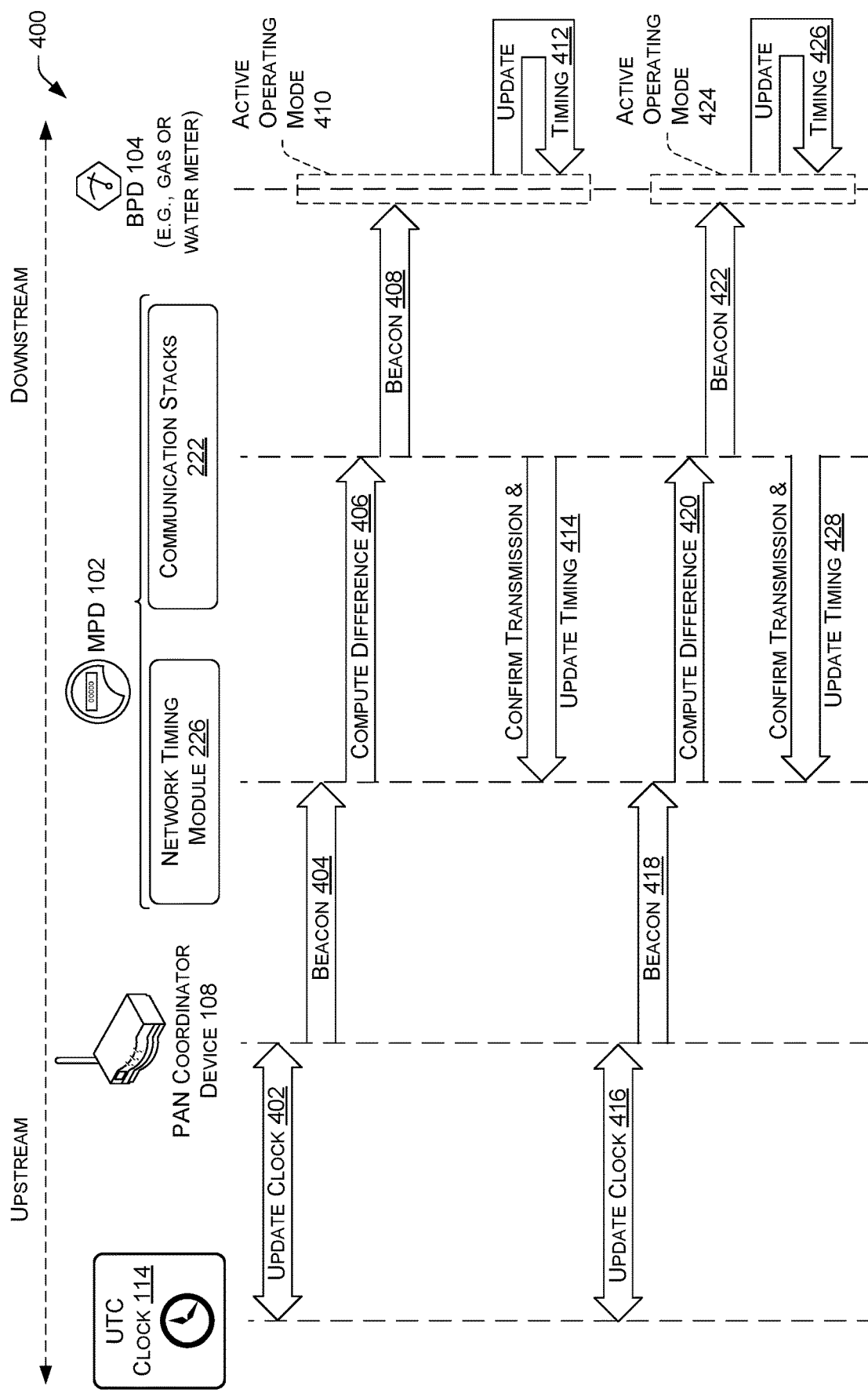
FIG. 4 is a signal flow diagram which illustrates an example process for propagating an updated network reference time through a network of devices, such as Mains Powered Devices and Battery Powered Devices.

FIG. 4 is a signal flow diagram which illustrates an example process 400 for propagating an updated network reference time through a network of devices (e.g., BPDs 104, MPDs 102, etc.) according to the techniques described herein. As described herein, the components and description of MPD 200 and BPD 300 are used interchangeably with the MPD 102 and BPD 104, respectively.

At 402, a PAN coordinator device 108 may update its clock based on a UTC clock 114. For instance, the PAN coordinator device may communicate over network 110 to determine the UTC and update its clock.

At 404, the PAN coordinator device 108 may send a beacon message to an MPD 102, which is downstream in the network from the PAN coordinator device 108. In some examples, the beacon message includes the UTC, which is used as an updated network reference time.

At 406, the network timing module 226 of the MPD 102 may compute a time difference between the updated network reference time indicated in the beacon message received at 404 and a current network reference time of the clock 204 of the MPD 102.

At 408, the communication stacks 222 may send a beacon message to downstream devices, such as BPD 104. In some examples, the beacon message sent at 408 may include various synchronization timing information, such as the updated network reference time and the computed time difference. In some examples, the beacon message sent by the communication stacks 222 may be sent using a MAC layer of the AN 106.

At 410, the BPD 104 may transition from a low-power operating mode for a period of time (e.g., a listening window) to an active operating mode. While in the active operating mode 410, the BPD 104 may receive the beacon message 408 and update its timing at 412. In some examples, at 412 the BPD 104 may update its clock 304 based on the updated network reference time. In various examples, the BPD 104 may further determine, based at least in part on the updated network reference time and the computed time difference, a drift time for the clock 304, and determine a subsequent listening window for the next scheduled periodic beacon message transmission.

At 414, the communication stacks 222 may confirm transmission of the beacon message sent at 408, which may cause the network timing module 226 to update the timing of the MPDs 102 internal clock 204 based on the updated network reference time.

At 416, the PAN coordinator device 108 may determine, based on a communication schedule, that a periodic update to the network reference time is to be performed. The PAN coordinator device 108 may update its clock at 416 based on the UTC clock 114.

At 418, the PAN coordinator device 108 may send a beacon message to the MPD 102, which is downstream in the network from the PAN coordinator device 108. In some examples, the beacon message includes the UTC, which is used as an updated network reference time.

At 420, the network timing module 226 of the MPD 102 may compute another time difference between the updated network reference time indicated in the beacon message received at 418 and a current network reference time of the clock 204 of the MPD 102. The current reference time of the clock 204 may correspond, with some error, to the network reference time included in the beacon sent at 404.

At 422, the communication stacks 222 may send another beacon message to downstream devices, such as BPD 104. In some examples, the beacon message sent at 422 may include various synchronization timing information, such as the updated network reference time and the computed time difference determined at 420. In some examples, the beacon message sent by the communication stacks 222 may be sent using a MAC layer of the AN 106.

At 424, the BPD 104 may transition from the low-power operating mode for a period of time (e.g., a listening window) to the active operating mode. The listening window at 424 may be smaller than that of 410, and correspond to the listening window determined at 412. While in the active operating mode at 424, the BPD 104 may receive the beacon message 422 and update its timing at 426. In some examples, at 426 the BPD 104 may update its clock 304 based on the updated network reference time. In various examples, the BPD 104 may further determine, based at least in part on the updated network reference time and the computed time difference, a drift time for the clock 304 and determine a subsequent listening window for the next scheduled periodic beacon message transmission.

At 428, the communication stacks 222 may confirm transmission of the beacon message sent at 422, which may cause the network timing module 226 to update the timing of the MPDS 102 internal clock 204 based on the updated network reference time.

Figure 5A:
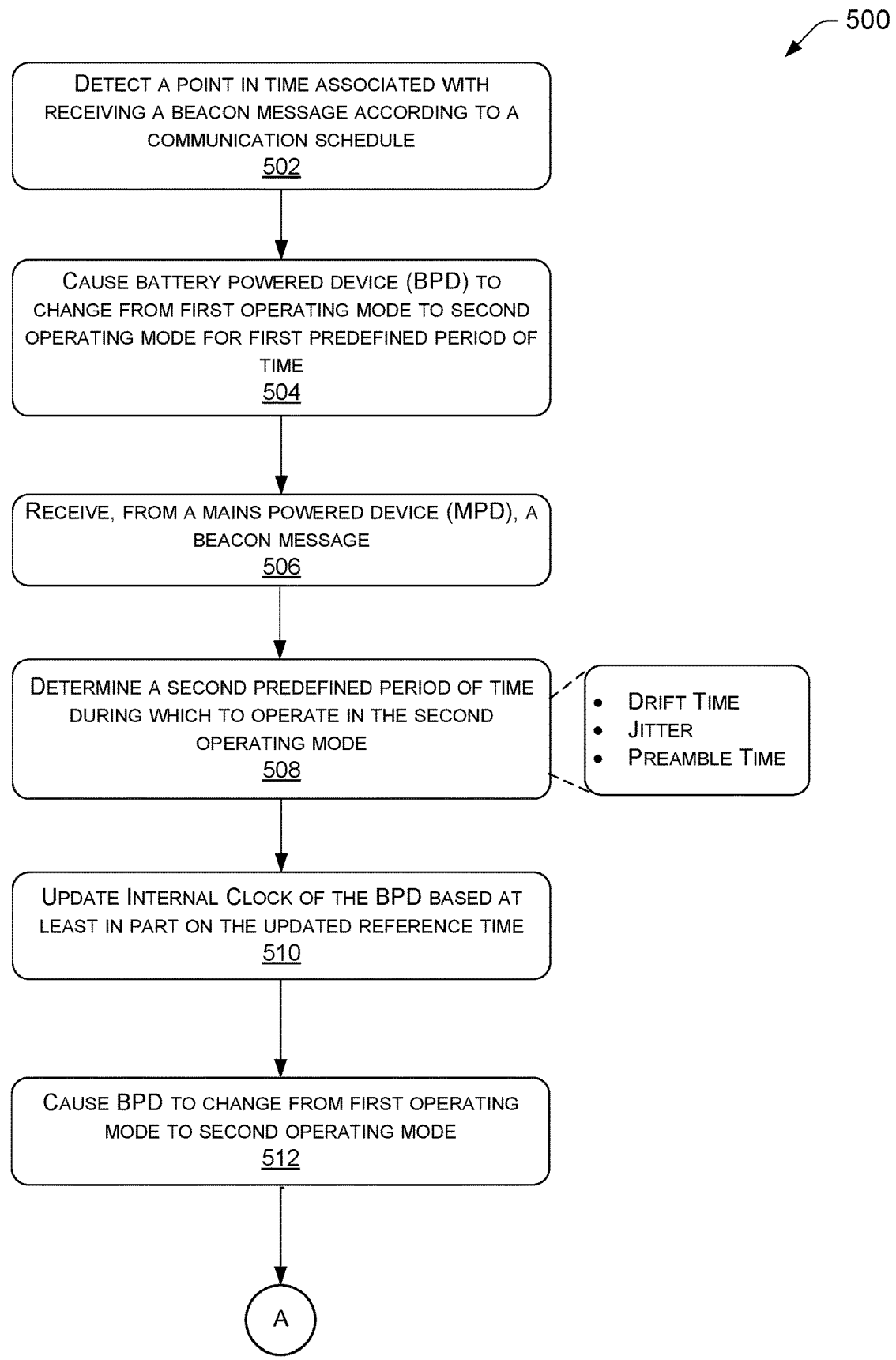
FIGS. 5A and 5B illustrate an example process for a Battery Powered Device determining a new listening window and updating its internal clock based on synchronizing time information received in a beacon message.
Figure 5B:
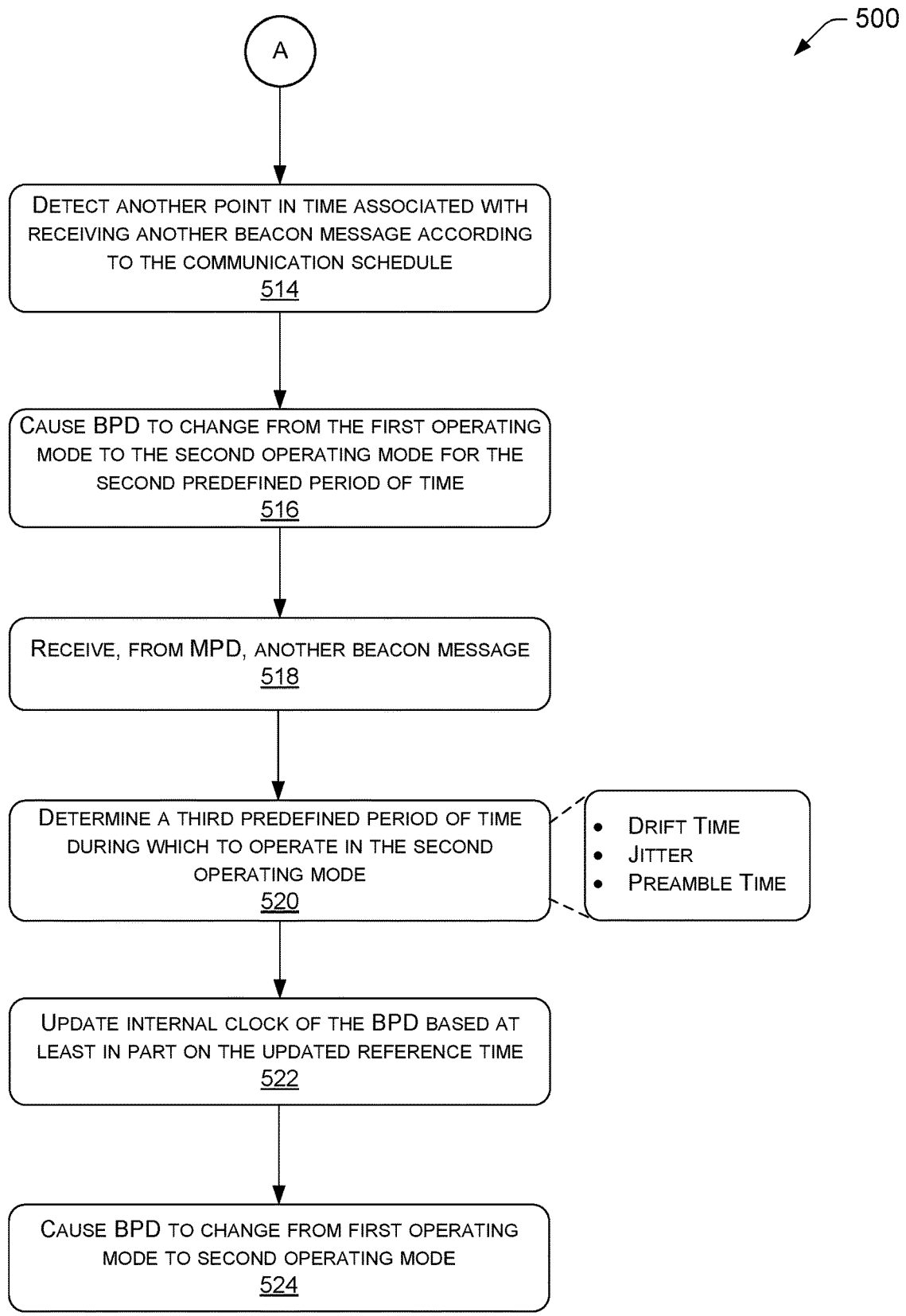
Figure 6:
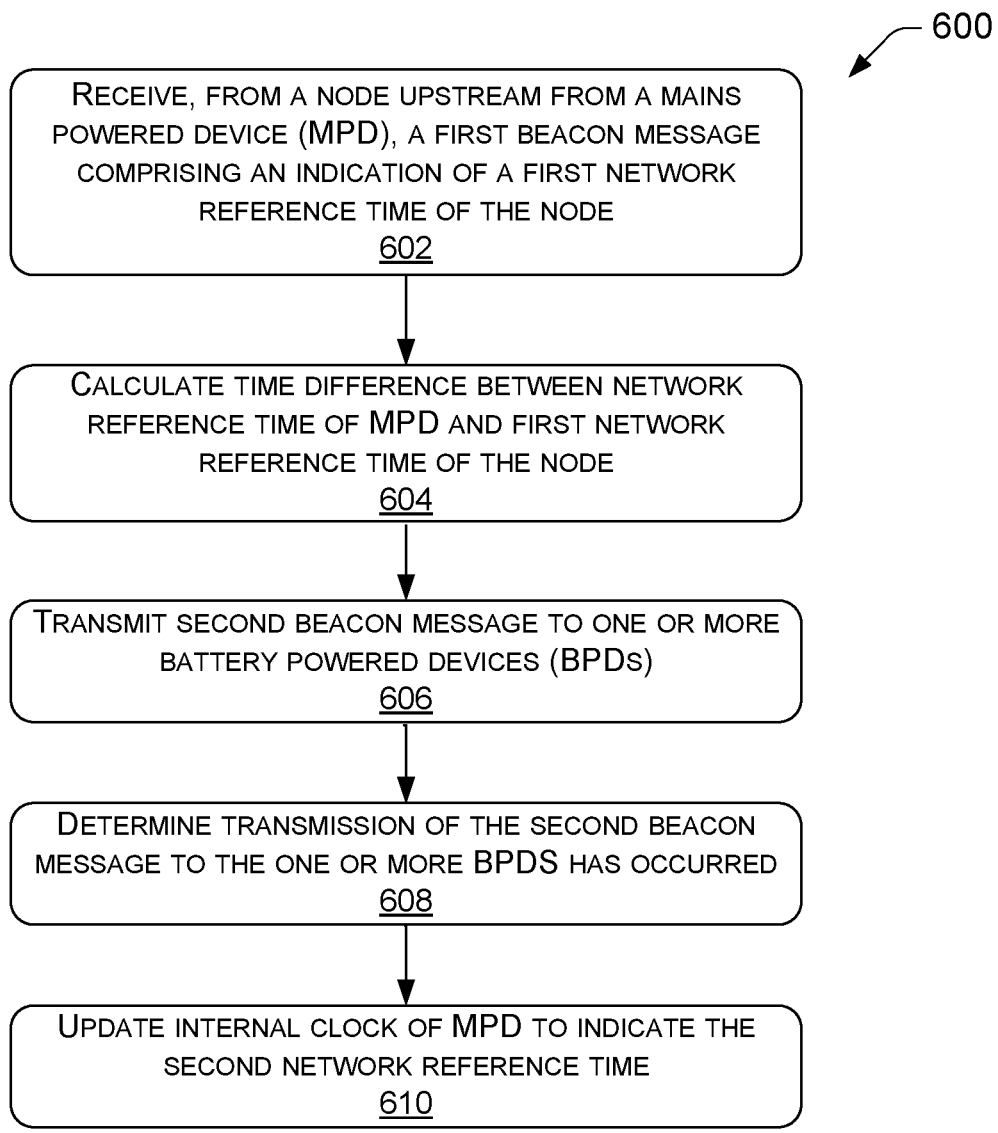
FIG. 6 illustrates an example process for a mains powered device refraining from updating its internal clock with an updated network reference time until a beacon message has been transmitted to downstream battery powered devices.

FIGS. 5A, 5B, and 6 illustrate example processes 500 and 600 for employing the techniques discussed herein. For ease of illustration the processes 500 and 600 may be described as being performed by a device described herein, such as the MPD 200 and/or the BPD 300. However, the processes 500 and 600 may be performed by other devices. Moreover, the devices may be used to perform other processes.

The processes 500 and 600 (as well as each process described herein) are illustrated a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIGS. 5A and 5B an example process 500 for a Battery Powered Device (BPD 300) determining a new listening window and updating its internal clock based on synchronizing time information received in a beacon message.

At 502, the communication stack 322 may detect, based at least in part on the clock 304 of the BPD 300, a point in time associated with receiving a beacon message according to a communication schedule 324.

At 504, the communication stacks 322 may cause the BPD 300 to change from a first operating mode (e.g., low-power operating mode) to a second operating mode (e.g., active operating mode) for a first predefined period of time (e.g., initial listening window). In some examples, the MPD 300 may consume less power in the first operating mode than in the second operating mode. In some examples, the communication stacks 322 may cause the BPD 300 to change from the first operating mode to the second operating mode responsive to detecting the point in time associated with receiving the beacon message. For instance, the communication stacks 322 may identify a beginning of a period of time scheduled in the communication schedule 324 for receiving the beacon message.

In some examples, steps 506-512 may be performed while the BPD 300 is in the active operating mode.

At 506, the BPD 300 may receive, via network interfaces 306, a beacon message from an MPD 200. In some examples, the beacon message may comprise an updated reference time for the AN 106 and a computed time difference between the updated reference time and a previous reference time of a clock 204 of the MPD 200.

At 508, the listening window determination module 328 may determine, based at least in part on the updated reference time and the computed time difference, a second predefined period of time (e.g., subsequent listening window) during which to operate in the second operating mode according to the communication schedule 324. In some examples, determining the second predefined period of time may comprise determining a drift time indicating an amount of time the clock 304 drifted from an initial reference time for the BPD 300, wherein the initial reference time is associated with a previous beacon message, and wherein determining the drift time comprises calculating a difference between a particular point in time indicated by the clock and a corresponding point in time of a combination of the updated reference time and the computed time difference, and calculating the second predefined period of time based at least in part on a combination of the drift time and the computed time difference.

In some instances, calculating the second predefined period of time based at least in part on a combination of the drift time and the computed time difference may comprise (i) multiplying the drift time by a factor of two to result in a first amount of time, (ii) multiplying the computed time difference by a factor of two to result in a second amount of time, (iii) identifying a third amount of time associated with analyzing/decoding a preamble of the beacon message, and (iv) adding the first amount of time, the second amount of time, and the third amount of time to result in the second predefined period of time.

At 510, the clock update module 326 may update the clock 304 of the BPD 300 based at least in part on the updated reference time for the AN 106.

At 512, the communication stack 322 may cause the BPD 300 to change from the second operating mode to the first operating mode in response to detecting an end of the first predefined period of time (e.g., initial listening window).

At 514, shown in FIG. 5B, the communication stack 322 may detect, based at least in part on the clock 304 of the BPD 300, another point in time (e.g., start of subsequent periodic listening window) associated with receiving another beacon message according to the communication schedule 324.

At 516, the communication stacks 322 may again cause the BPD 300 to change from the first operating mode (e.g., low-power operating mode) to the second operating mode (e.g., active operating mode) for the second predefined period of time (e.g., the subsequent listening window). In some examples, the second predefined period of time may correspond to the period of time calculated at 508.

At 518, the BPD 300 may receive, via network interfaces 306, another beacon message from the MPD 200. In some examples, the other beacon message may comprise an updated reference time for the AN 106 and a computed time difference between the updated reference time and a previous reference time of a clock 204 of the MPD 200.

At 520, the listening window determination module 328 may determine, based at least in part on the updated reference time and the computed time difference, a third predefined period of time (e.g., subsequent listening window) during which to operate in the second operating mode according to the communication schedule 324. In some examples, the listening window determination module 328 may determine the third predefined period of time using techniques similar to those described at 508.

At 522, the clock update module 326 may update the clock 304 of the BPD 300 based at least in part on the updated reference time for the AN 106.

At 524, the communication stack 322 may cause the BPD 300 to change from the second operating mode to the first operating mode in response to detecting an end of the second predefined period of time (e.g., subsequent listening window).

FIG. 6 illustrates an example process 600 for a mains powered device (MPD 200) refraining from updating its internal clock with an updated network reference time until a beacon message has been transmitted to downstream BPDs 300

At 602, communication stacks 222 of the MPD 200 may receive, from a node (e.g., PAN coordinator device 108) upstream from the MPD 200, a first beacon message comprising an indication of a first network reference time of the node. In some examples, the first network reference time may comprise a UTC determined or obtained by the PAN coordinator device 108 from the UTC 114 over the network 110.

At 604, the network timing module 226 may calculate a time difference between a network reference time of the MPD and the first network reference time of the node, (e.g., the UTC from the PAN coordinator device 108).

At 606, the communication stacks 224 may transmit, via network interfaces 206 and to one or more BPDs 300 associated with the MPD 200, a second beacon message including an indication of a second network reference time of the MPD 200, wherein the one or more BPDs 300 are downstream from the MPD 200 in the AN 106. In some examples, the second beacon message further includes an indication of the time difference.

In some examples, transmitting the second beacon message may comprise transmitting the second beacon message to a first set of BPDs 300 according to a first communication schedule for the first set of BPDs, and transmitting the second beacon message to a second set of BPDs 300 according to a second communication schedule for the second set of BPDs 300.

At 608, the communication stacks 222 may determine that transmission of the second beacon message to the one or more battery powered devices has occurred. In some examples, determining that the transmission of the second beacon message has occurred comprises determining that transmission of the second beacon message to the first set of BPDs 300 has occurred and that transmission of the second beacon message to the second set of BPDs 300 has occurred.

At 610, the network timing module 226 may update the internal clock 204 of the MPD 200 to indicate the second network reference time based at least in part on determining that the transmission of the second beacon message has occurred.

CONCLUSION

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A method of performing time synchronization for a battery powered device operating in a network of devices, the method comprising:
  causing, based at least in part on a communication schedule, the battery powered device to change from a first operating mode to a second operating mode for a first predefined period of time, wherein the battery powered device consumes less power in the first operating mode than in the second operating mode;
  while in the second operating mode:
    receiving, by the battery powered device and from a mains powered device upstream from the battery powered device in the network, a beacon message, wherein the beacon message comprises an updated reference time for the network and a computed time difference between the updated reference time and a previous reference time of the mains powered device;
    determining, by the battery powered device and based at least in part on the updated reference time and the computed time difference, a second predefined period of time during which to operate in the second operating mode according to the communication schedule;
    updating an internal time of a clock of the battery powered device based at least in part on the updated reference time for the network; and
    in response to detecting an end of the first predefined period of time, causing the battery powered device to change from the second operating mode to the first operating mode.

2. The method of claim 1, further comprising:
  detecting, based at least in part on the clock of the battery powered device, a point in time associated with receiving the beacon message according to the communication schedule,
  wherein causing the battery powered device to change from the first operating mode to the second operating mode is performed responsive to detecting the point in time.

3. The method of claim 2, further comprising:
  detecting, based at least in part on the clock of the battery powered device, another point in time associated with receiving another beacon message according to the communication schedule for the battery powered device;
  responsive to detecting the other point in time, causing the battery powered device to change from the first operating mode to the second operating mode for the second predefined period of time; and
  while in the second operating mode, receiving the other beacon message from the mains powered device.

4. The method of claim 1, wherein determining the second predefined period of time comprises:
  determining a drift time indicating an amount of time the clock drifted from an initial reference time for the battery powered device, wherein the initial reference time is associated with a previous beacon message, and wherein determining the drift time comprises calculating a difference between a particular point in time indicated by the clock and a corresponding point in time of a combination of the updated reference time and the computed time difference; and calculating the second predefined period of time based at least in part on a combination of the drift time and a jitter time associated with the network.

5. The method of claim 4, wherein calculating the second predefined period of time based at least in part on a combination of the drift time and the computed time difference comprises:

multiplying the drift time by a factor of two to result in a first amount of time;

multiplying a jitter time associated with the network by a factor of two to result in a second amount of time;

identifying a third amount of time associated with analyzing a preamble of the beacon message; and adding the first amount of time, the second amount of time, and the third amount of time to result in the second predefined period of time.

6. The method of claim 1, wherein the updated reference time is associated with a coordinated universal time (UTC) determined by a personal area network (PAN) coordinating device associated with the network.

7. The method of claim 1, wherein the second predefined period of time is shorter than the first predefined period of time.

8. A battery powered device comprising:

one or more network communications interfaces to communicate on a network;

an internal clock indicating a first network reference time;

one or more processors communicatively coupled to the one or more network communications interfaces and the internal clock; and memory communicatively coupled to the one or more processors, the memory storing one or more instructions that, when executed by the one or more processors, cause the one or more processors to perform operations comprising:

receiving, from a mains powered device upstream in the network to the battery powered device, a message, wherein the message comprises an updated network reference time and a computed time difference between the updated network reference time and a previous network reference time of the mains powered device;

determining, based at least in part on the updated network reference time and the computed time difference, a predefined window of time during which to operate in an active operating mode;

updating the internal clock to indicate the updated network reference time; and in response to detecting an end of the first predefined period of time, causing the battery powered device to change from the second operating mode to the first operating mode.

9. The battery powered device of claim 8, the operations further comprising:

prior to receiving the message:

detecting, based at least in part on the internal clock and based at least in part on a communication schedule, a point in time associated with a beginning of a previously predefined window of time; and causing, based at least in part on the communication schedule, the battery powered device to change from a low power operating mode to the active operating mode for the previously predefined window of time, wherein the battery powered device consumes less power in the low power operating mode than in the active operating mode, wherein receiving the message, determining the predefined window of time, and updating the internal clock are performed while in the active operating mode; and in response to detecting an end of the previously predefined window of time, causing the battery powered device to change from the active operating mode to the low power operating mode.

10. The battery powered device of claim 9, the operations further comprising:

detecting, based at least in part on the internal clock indicating the updated network reference time and according to the communication schedule, another point in time associated with a beginning of the predefined window of time;

responsive to detecting the other point in time, causing the battery powered device to change from the low power operating mode to the active operating mode; and receiving, from the mains powered device, another message.

11. The battery powered device of claim 8, wherein determining the predefined window of time comprises:

determining a drift time indicating an amount of time the internal clock changed from the first network reference time, wherein the first network reference time is associated with data received in a previous message, and wherein determining the drift time comprises calculating a difference between a particular point in time indicted by the first network reference time and a corresponding point in time of a combination of the updated network reference time and the computed time difference; and calculating the predefined window of time based at least in part on the drift time and a jitter time associated with the network.

12. The battery powered device of claim 11, wherein calculating the predefined window of time comprises:

multiplying the drift time by a first factor to result in a first amount of time;

multiplying the jitter time by a second factor to result in a second amount of time; and determining the predefined window of time based on the first amount of time and the second amount of time.

13. The battery powered device of claim 12, wherein calculating the predefined window of time further comprises:

identifying a third amount of time associated with analyzing a preamble of a message; and adding the first amount of time, the second amount of time, and the third amount of time to result in the predefined window of time.

14. The battery powered device of claim 8, wherein the updated network reference time is associated with a coordinated universal time (UTC) determined by a personal area network (PAN) coordinating device associated with the network.

15. A mains powered device comprising:

an internal clock indicating a network reference time;

one or more processors coupled to the internal clock; and memory communicatively coupled to the one or more processors, the memory storing one or more instructions that, when executed by the one or more processors, cause the one or more processors to perform operations comprising:

receiving, from a node upstream in a network to the mains powered device, a first beacon message comprising an indication of a first network reference time of the node;

transmitting, to one or more battery powered devices associated with the mains powered device, a second beacon message including an indication of a second network reference time of the mains powered device, wherein the one or more battery powered devices are downstream from the mains powered device in the network;

determining that transmission of the second beacon message to the one or more battery powered devices has occurred; and based at least in part on determining that the transmission of the second beacon message has occurred, updating the internal clock of the mains powered device to indicate the second network reference time, wherein,
the operations further comprise calculating a time difference between the network reference time and the first network reference time; and
the second beacon message further includes an indication of the time difference.

16. The mains powered device of claim 15, wherein:
the mains powered device comprises a personal area network (PAN) coordinating device; and
the first network reference time comprises a coordinated universal time (UTC).

17. The mains powered device of claim 15, wherein:
the node from which the first beacon message is received comprises another mains powered device disposed between the mains powered device and a personal area network (PAN) coordinating device of the network; and
the first network reference time is associated with an internal clock of the other mains powered device.

18. The mains powered device of claim 15, wherein:
transmitting the second beacon message comprises:
transmitting the second beacon message to a first set of battery powered devices according to a first communication schedule for the first set of battery powered devices; and
transmitting the second beacon message to a second set of battery powered devices according to a second communication schedule for the second set of battery powered devices; and
determining that the transmission of the second beacon message has occurred comprises determining that transmission of the second beacon message to the first set of battery powered devices has occurred and that transmission of the second beacon message to the second set of battery powered devices has occurred.

19. The mains powered device of claim 15, the operations further comprising:
determining, based at least in part on a communication schedule, that the one or more battery powered devices are operating in an active operating mode for a predefined period of time, wherein the active operating mode configures the one or more battery powered devices to receive transmissions, and
wherein the transmitting the second beacon message to the one or more battery powered devices is based at least in part on determining that the one or more battery powered devices are operating in the active operating mode.

* * * * *